United States Patent [19]
Galbraith et al.

[11] Patent Number: 5,708,537
[45] Date of Patent: Jan. 13, 1998

[54] INTELLIGENT ENVELOPE DETECTOR AND METHOD FOR GAIN CONTROL FOR PRML DATA AND SERVO CHANNELS INCLUDING POLARITY DETECTION

[75] Inventors: Richard Leo Galbraith; David James Stanek, both of Rochester, Minn.

[73] Assignee: International Business Machines Corporation, Armonk, N.Y.

[21] Appl. No.: 555,781

[22] Filed: Nov. 9, 1995

[51] Int. Cl.$^6$ ...................................... G11B 5/09
[52] U.S. Cl. .................... 360/46; 360/77.08; 327/78; 327/306
[58] Field of Search ...................... 360/46, 77.08, 360/77.05, 78.04; 318/618; 361/111; 375/319, 341, 354; 330/126, 280; 348/683; 327/77, 78, 79, 58, 62, 306; 341/139, 59; 371/21.2, 40.1; 364/724.19, 724.16

[56] References Cited

U.S. PATENT DOCUMENTS

| | | | |
|---|---|---|---|
| 4,467,287 | 8/1984 | Aylward | 330/126 |
| 4,539,692 | 9/1985 | Munter | 375/345 |
| 4,750,058 | 6/1988 | Hirt et al. | 360/46 |
| 5,220,466 | 6/1993 | Coker et al. | 360/46 |
| 5,233,482 | 8/1993 | Galbraith et al. | 360/46 |
| 5,426,541 | 6/1995 | Coker et al. | 360/65 |
| 5,438,460 | 8/1995 | Coker et al. | 360/46 |
| 5,442,492 | 8/1995 | Cunningham et al. | 360/46 |

FOREIGN PATENT DOCUMENTS 4-8007  1/1992  Japan .

*Primary Examiner*—Thang V. Tran
*Assistant Examiner*—Patrick Wamsley
*Attorney, Agent, or Firm*—Joan Pennington

[57] ABSTRACT

A method and apparatus are provided for gain adjustment of a signal. A plurality of comparators compare the signal with a plurality of threshold values. An envelope detector coupled to the comparator includes a peak capture function for detecting the amplitude of the signal and a polarity memory for detecting polarity of the signal. A gain control function for setting a gain correction value is responsive to the peak capture function and the polarity memory. Features of the signal gain adjustment method and apparatus of the invention include an intelligent hold of the gain control over both thermal asperities and null gaps in the signal.

14 Claims, 7 Drawing Sheets

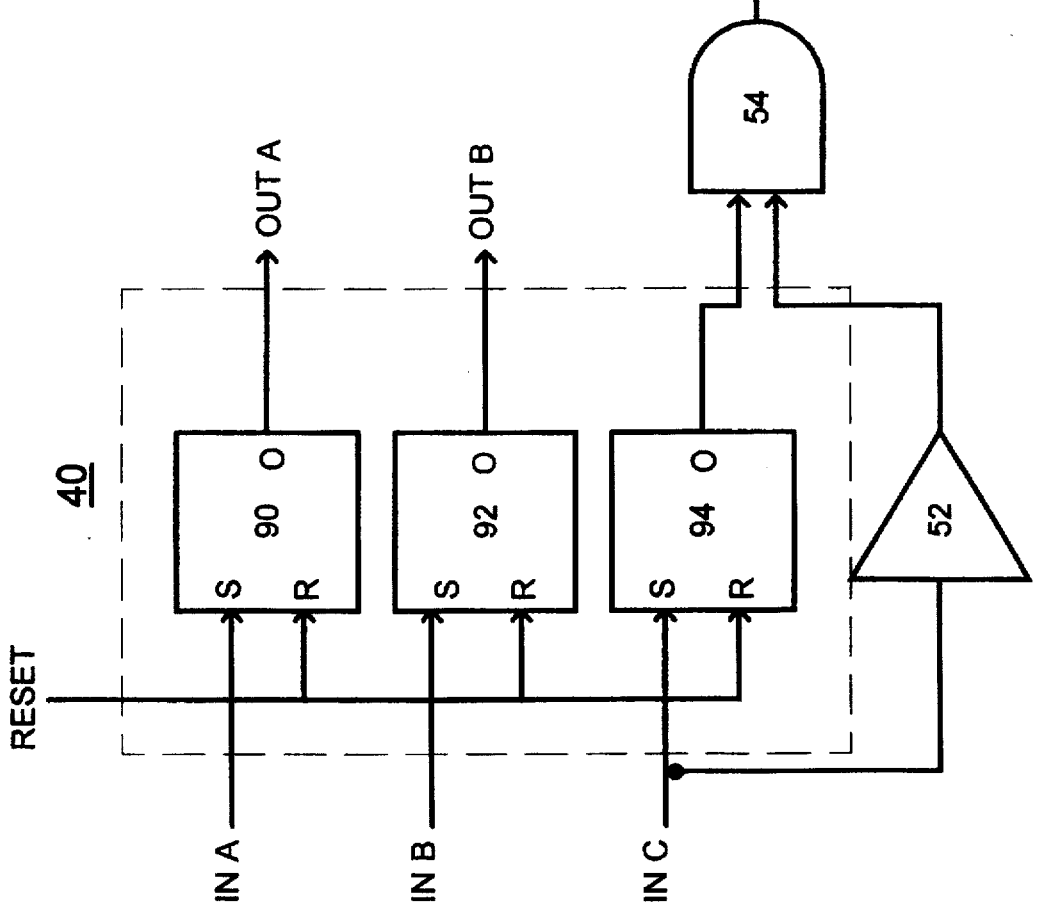

5,708,537

1

INTELLIGENT ENVELOPE DETECTOR AND METHOD FOR GAIN CONTROL FOR PRML DATA AND SERVO CHANNELS INCLUDING POLARITY DETECTION

FIELD OF THE INVENTION

The present invention relates to a method and apparatus for gain adjustment of a signal, and more particularly to a mixed signal, intelligent threshold based, clocked envelope detector with thermal asperity robustness and null signal tolerance for gain adjustment of a signal for partial-response maximum-likelihood (PRML) and servo channels in a direct access storage device (DASD).

DESCRIPTION OF THE PRIOR ART

In hard disk drives, the data channel and servo channel may be provided by a single integrated circuit (IC); however, both the PRML and servo channels have their own distinct needs for gain control. The data channel uses a complex synchronous gain and timing control loop during read operations, and while idle typically requires an envelope detector to keep the gain close to the required level for quick acquisition when a read begins.

Typically the servo channel requires an envelope detector to accurately setup the gain over a low-frequency analog gain control (AGC) field and then the gain is held over the timing mark, grey code, and fractional position information.

In a PRML data channel, a normalized readback signal amplitude is required for proper data detection. A variable gain amplifier (VGA) typically is used in the analog signal path for scaling of the readback signal. An acceptable tolerance on the signal amplitude must be maintained to enable proper operation of a maximum-likelihood detector. Known PRML and servo channels require either an analog envelope detector circuit or a digital sampling arrangement to provide gain corrections to the VGA. An example of an asynchronous, digital sampling, gain control arrangement is provided by U.S. Pat. No. 5,438,460 to Jonathan D. Coker and Richard L. Galbraith issued Aug. 1, 1995 to the present assignee. Another gain control arrangement is provided by U.S. Pat. No. 4,750,058 to Hirt et al. issued Jun. 7, 1988 to the present assignee.

Thermal asperities are becoming an increasing problem with decreasing flyheights in leading-edge hard disk drives. Thermal asperities typically cause a transient shift in the read signal. In many known gain control arrangements, a thermal asperity typically results in an incorrect adjustment of the VGA. All known envelope detectors have not been robust against thermal asperities.

U.S. Pat. No. 5,438,460 to Richard L. Galbraith, Gregory J. Kerwin and Joey M. Poss, issued Aug. 3, 1995 to the present assignee, discloses thermal asperity compensation methods and apparatus for data detection in a PRML data channel. While the disclosed thermal asperity compensation methods and apparatus provide improvements over many known arrangements, digital sampling solution, is used.

Short periods of null signal are also common on hard disk drive, due to gaps, certain code words, and the liken known envelope detectors put in same tolerance to this at the expense of recovery time in low gain situations.

Disadvantages of using an analog envelope detector circuit include the typically poor recovery from low gain situations. Other problems are that the analog envelope detector circuit provides no intelligence to handle thermal asperities; and no way to effectively handle the periods of null signal possible due to PRML codes, gaps, and the like.

2

All previous sampled digital solutions suffered from other problems including the power required by a high-speed analog-to-digital converter (ADC). Another problem resulting from the use of asynchronous samples is the poor peak-to-peak amplitude setup over random patterns. Also no intelligence is provided to handle thermal asperities.

SUMMARY OF THE INVENTION

A principal object of the present invention is to provide an improved method and apparatus for gain adjustment of a signal. Other objects are to provide such improved gain adjustment methods substantially without negative effects, further that eliminates the need for a high speed analog-to-digital converter, and that overcome many of the disadvantages of prior art arrangements.

In brief, a method and apparatus are provided for gain adjustment of a signal. A plurality of comparators compare the signal with a plurality of threshold values. An envelope detector coupled to the comparators includes a peak capture function for detecting the amplitude of the signal and a polarity memory for detecting polarity of the signal. A gain control function for setting a gain correction value is responsive to the peak capture function and the polarity memory. Features of the signal gain adjustment method and apparatus of the invention include an intelligent hold of the gain control over both thermal asperities and null gaps in the signal.

BRIEF DESCRIPTION OF THE DRAWINGS

The present invention together with the above and other objects and advantages may best be understood from the following detailed description of the preferred embodiments of the invention illustrated in the drawings, wherein:

FIG. 5 is a schematic diagram representation of a set-reset capture block of the intelligent threshold based, clocked envelope detector of FIG. 2;

FIG. 6 is a truth table for a set-reset latch of the capture block of FIG. 5;

DETAILED DESCRIPTION OF THE PREFERRED EMBODIMENTS

Figure 1:
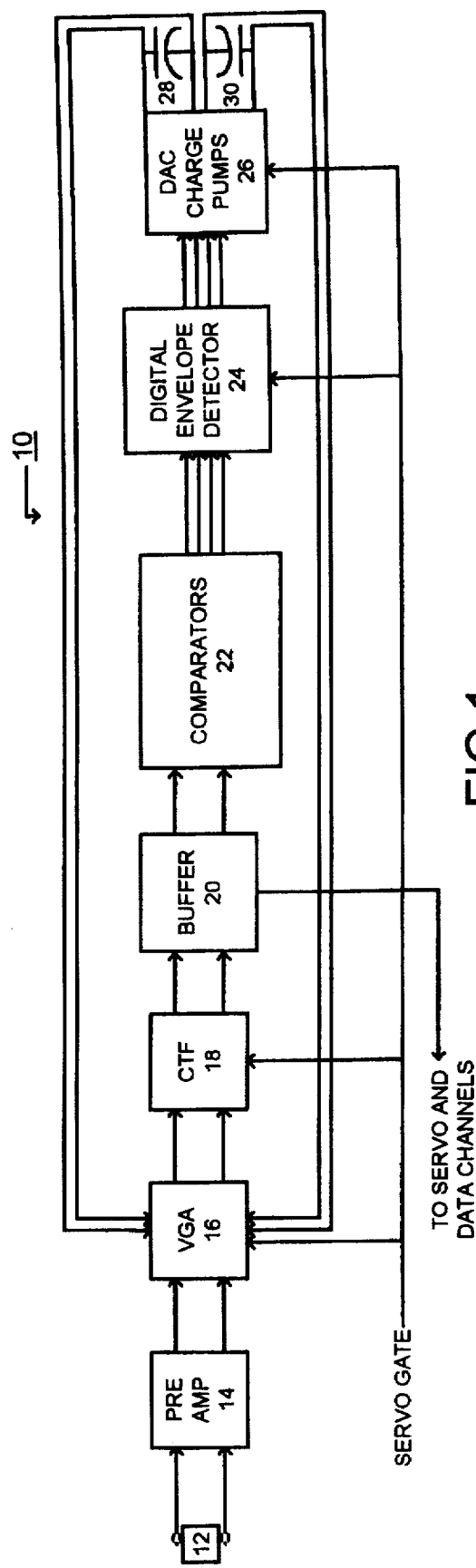
FIG. 1 is a block diagram of a mixed signal, gain control apparatus of the invention in the environment of partial-response maximum-likelihood (PRML) and servo channels in a direct access storage device (DASD)

Having reference now to the drawings, in FIG. 1 there is shown a mixed signal, gain control apparatus generally designated by the reference character 10 for gain adjustment of a signal in accordance with the present invention. Gain control apparatus 10 is used with partial-response maximum-likelihood (PRML) and servo channels in a direct access storage device (DASD).

A readback signal from a transducer head 12 amplified by a preamp 14 is applied to variable gain amplifier (VGA) 16. The signal output of VGA 16 is filtered by a continuous time filter (CTF) 18. A differential buffer 20 connected to the output of the CTF 18 couples the filtered, amplified signal to a plurality of comparators 22 and to the servo and data channels.

Figure 3:
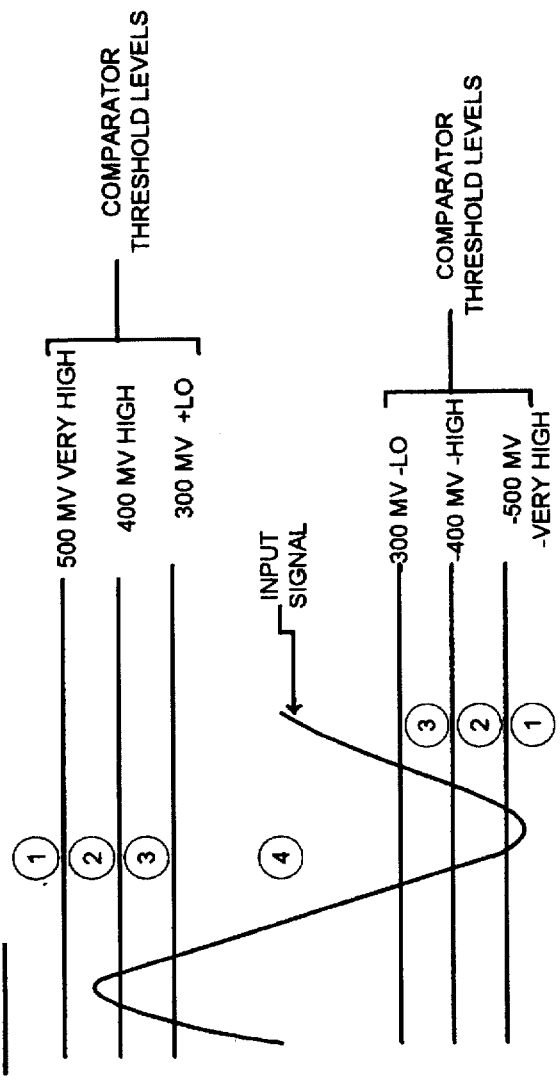
FIG. 3 is a graph illustrating an input signal of comparator block of the control apparatus of FIG. 1 together with comparator threshold levels.
Figure 4:
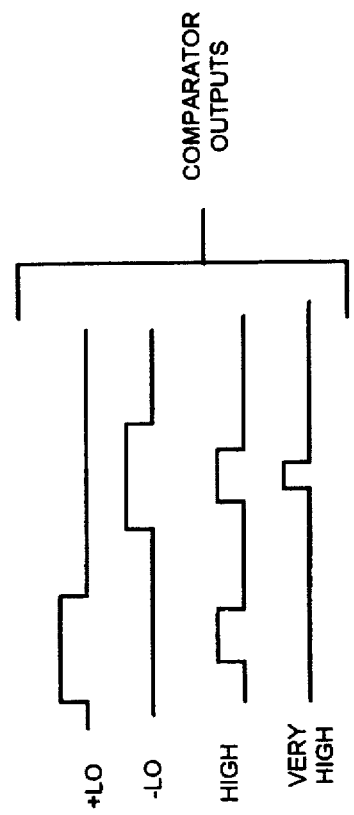
FIG. 4 is a diagram illustrating comparator outputs for the input signal shown in FIG. 3.

As illustrated in FIGS. 3 and 4, the comparators 22 compare the received signal with a plurality of predefined, positive and negative polarity threshold values and provide representative signal inputs to a digital envelope detector 24. Appropriate gain adjustment is provided by the intelligent threshold based, clocked envelope detector 24 responsive to the received signal inputs. The envelope detector 24 applies control signals to digital-to-analog converter (DAC) charge pumps 26. A gain control voltage operatively controlled by the DAC charge pumps 26, is provided across a data capacitor 28 or a servo capacitor 30 coupled to the VGA 16 for gain adjustment.

VGA 16 is operatively controlled to provide a nominal signal amplitude level, for example at 800 mV or +400 mV and −400 mV. As illustrated in FIG. 3, the predefined threshold values include selected positive and negative threshold values, such as, ±VERY HIGH (±500 mV); ±HIGH (±400 mV); and ±LOW (±300 mV). For the illustrated signal input of FIG. 3, the comparators 22 provide four outputs +LO, −LO, HIGH, and VERY HIGH, as shown in FIG. 4.

Figure 2:
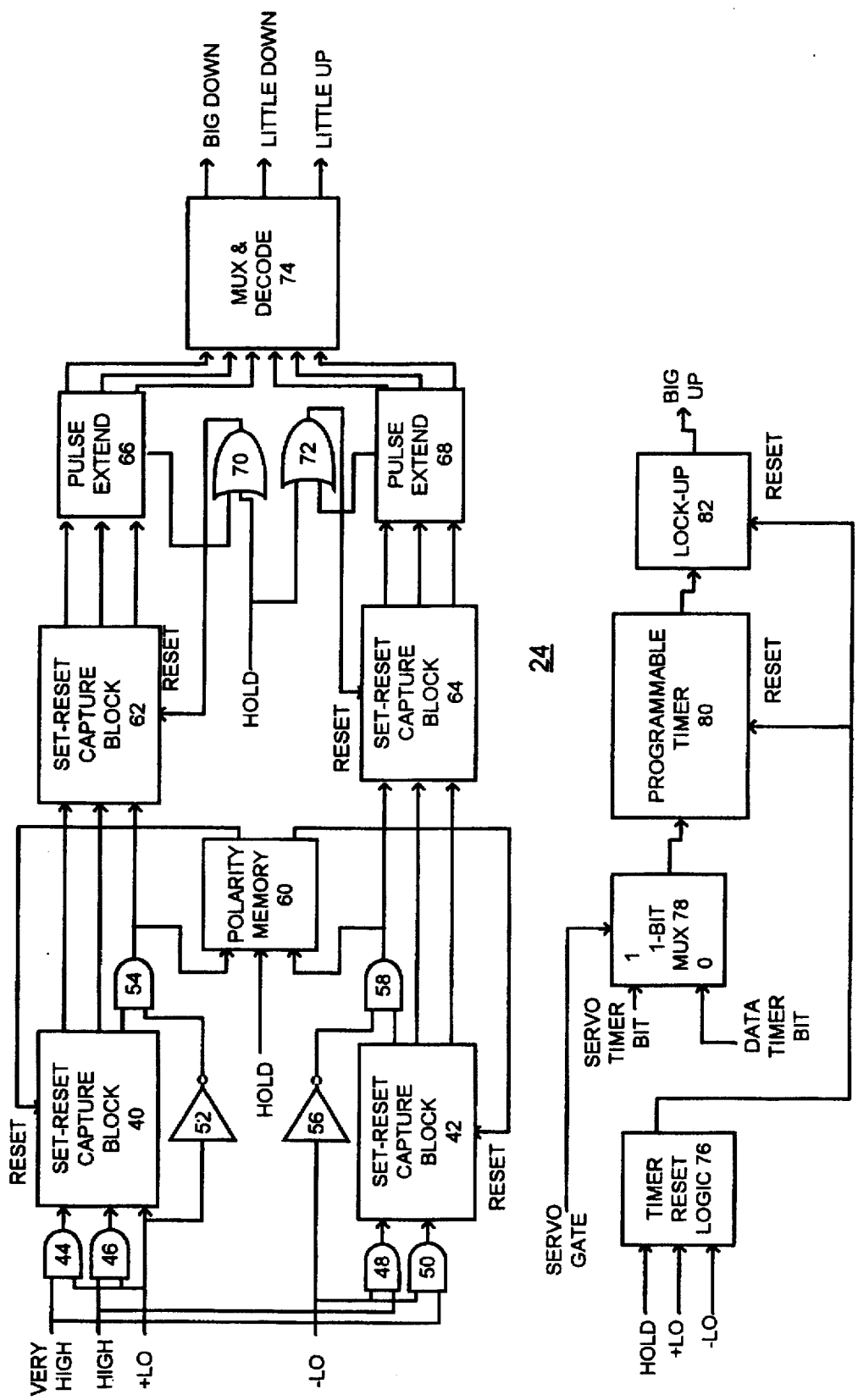
FIG. 2 is a schematic and block diagram representation of an intelligent threshold based, clocked envelope detector of the control apparatus of FIG. 1 in accordance with the invention.

Referring now to FIG. 2, the intelligent threshold based, clocked envelope detector 24 is shown. Features of envelope detector 24 include thermal asperity robustness and null signal tolerance. The envelope detector 24 includes a positive polarity set-reset capture block 40 and a negative polarity set-reset capture block 42 to detect a rough estimate of the VGA signal amplitude (either low, high, or very high). Each set-reset capture block 40 and 42 receives the HIGH, VERY HIGH and one of the +LO, −LO outputs of comparators 22 via a pair of AND gates 44, 46, 48 and 50, as shown. A respective output of the set-reset capture blocks 40 and 42 and the positive +LO comparator output inverted by an inverter 52 are applied to an AND gate 54 and the negative −LO comparator output inverted by an inverter 56 are applied to an AND gate 58. The outputs of AND gates 54 and 58 are applied to a polarity memory 60. The polarity memory 60 requiring alternating polarities for gain correction, is used to detect thermal asperities. In operation when the polarity memory 60 receives a high output from AND gate 54, polarity memory 60 resets the set-reset capture block 40, and releases the set-reset capture block 42. When the polarity memory 60 receives a high output from AND gate 58, polarity memory 60 resets the set-reset capture block 42, and releases the set-reset capture block 40. Once a comparator threshold level output is detected by the set-reset capture blocks 40 and 42, a second pair of positive and negative polarity set-reset capture blocks 62 and 64 copies the coarse amplitude threshold level (low, high or very high) until it can be clocked into a respective pulse extension circuit 66 and 68. The pulse extension circuits or pulse extends 66 and 68 apply a reset input to the capture blocks 62 and 64 via a pair of OR gates 70 and 72 when the capture block input is no longer required. The pulse extension circuits 66 and 68 clocked by an oscillator (not shown) provide a predefined pulse width for the correction pulse, for example a 2-bit time correction pulse. The correction pulse output of the pulse extend 66 and 68 is converted into an appropriate gain correction by a multiplexer and decode 74 at its outputs labeled BIG DOWN, LITTLE DOWN, and LITTLE UP.

Referring also to FIGS. 3 and 4, when the input signal is in region 1 above the comparator threshold level HIGH, then the correction will be a BIG DOWN. When the input signal is in region 2 above the comparator threshold level HIGH, then the correction will be a LITTLE DOWN. When the input signal is in region 3 above the comparator threshold level LO, then the correction will be a LITTLE UP.

An external input HOLD is applied to the polarity memory 60 and to the set-reset capture blocks 62 and 64 via a respective one of the OR gates 70 and 72 so that no correction is applied to the pulse extends 66 and 68 until the HOLD input is removed. Envelope detector 24 provides a programmable null signal detection function including a timer reset logic block 76, a 1-bit multiplexer 78, a programmable timer 80 and a lock-up 82. When determined that the gain of VGA 16 is truly low, a large gain correction is continuously applied by the lock-up 82 until the LO threshold signal amplitude is seen by the comparators 22. The amount of waiting time before applying a large gain correction at output labeled BIG UP is determined by the programmable timer 80. A select input labeled SERVO GATE is applied to the 1-bit multiplexer 78 to select a servo timer bit or a data time bit to set the programmable timer 80. The time delay provided by the programmable timer 80 is used to hold gain corrections over the selected period of no signal due to gaps, PRML codes, and the like. The timer reset logic block 76 provides a reset input to reset the programmable timer 80 and lock-up 82 with each +LO and −LO input.

FIG. 5 provides a schematic diagram representation for the set-reset capture blocks 40, 42, 62 and 64, such as set-reset capture block 40 of the envelope detector 24. Set-reset capture block 40 includes a corresponding capture latch 90, 92, and 94 for each input A, B and C, (VERY HIGH, HIGH, +LO) providing a respective output A and B (VERY HIGH, and HIGH); and inverter 52 and AND 54 to provide the output C (LO). Each capture latch 90, 92, and 94 operates independently on the set input A, B and C. The capture latch 90, 92, and 94 are reset together with the RESET input.

Figure 7:
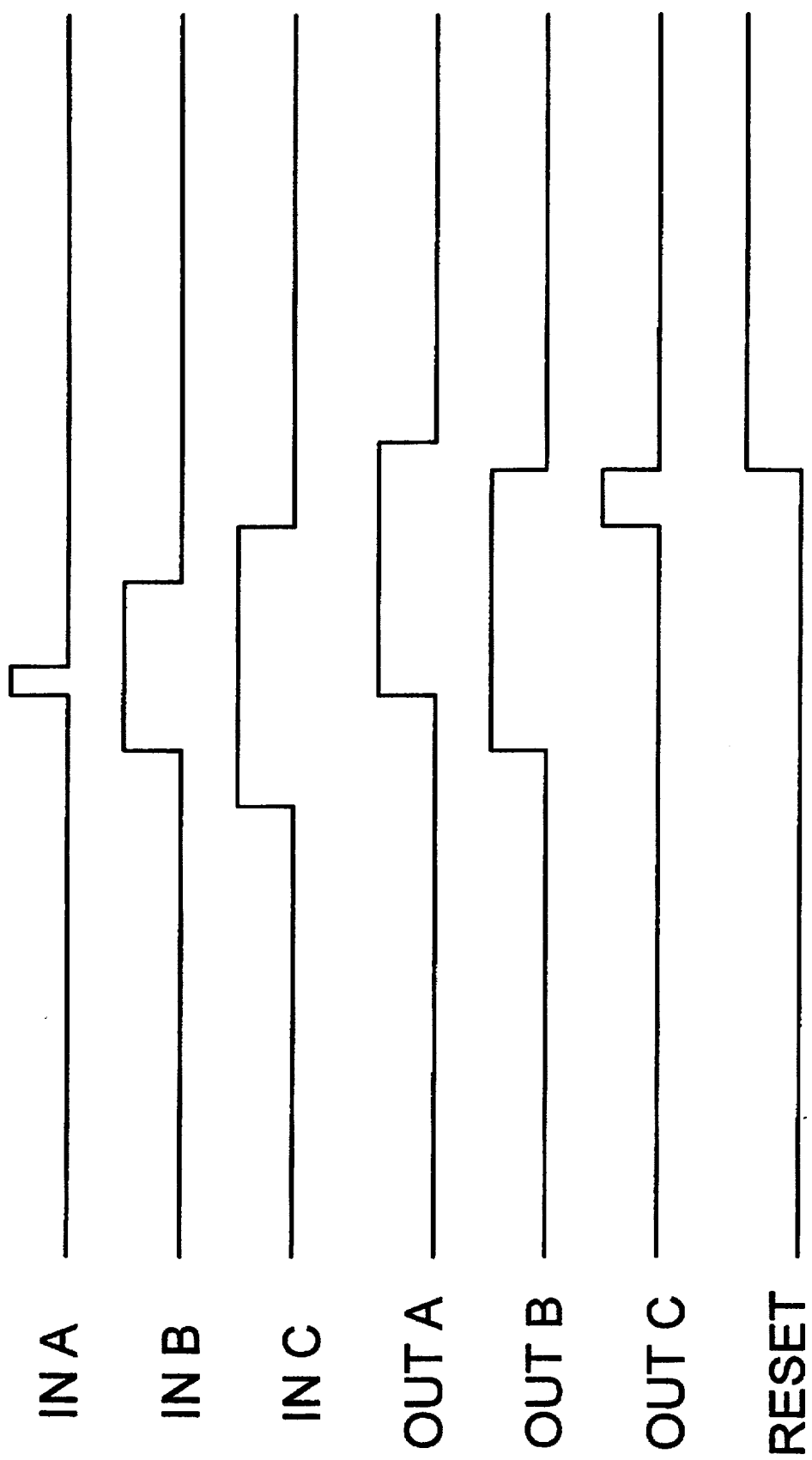
FIG. 7 is a timing chart illustrating the operation of the set-reset capture block of FIG. 5.

Operation of the set-reset capture blocks 62 and 64 may be understood having reference to FIGS. 6 and 7. FIG. 6 provides a truth table for each set-reset latch 92, 94 and 96 of the capture block 40. FIG. 7 provides a timing chart illustrating the operation of the set-reset capture block 40.

Figure 8:
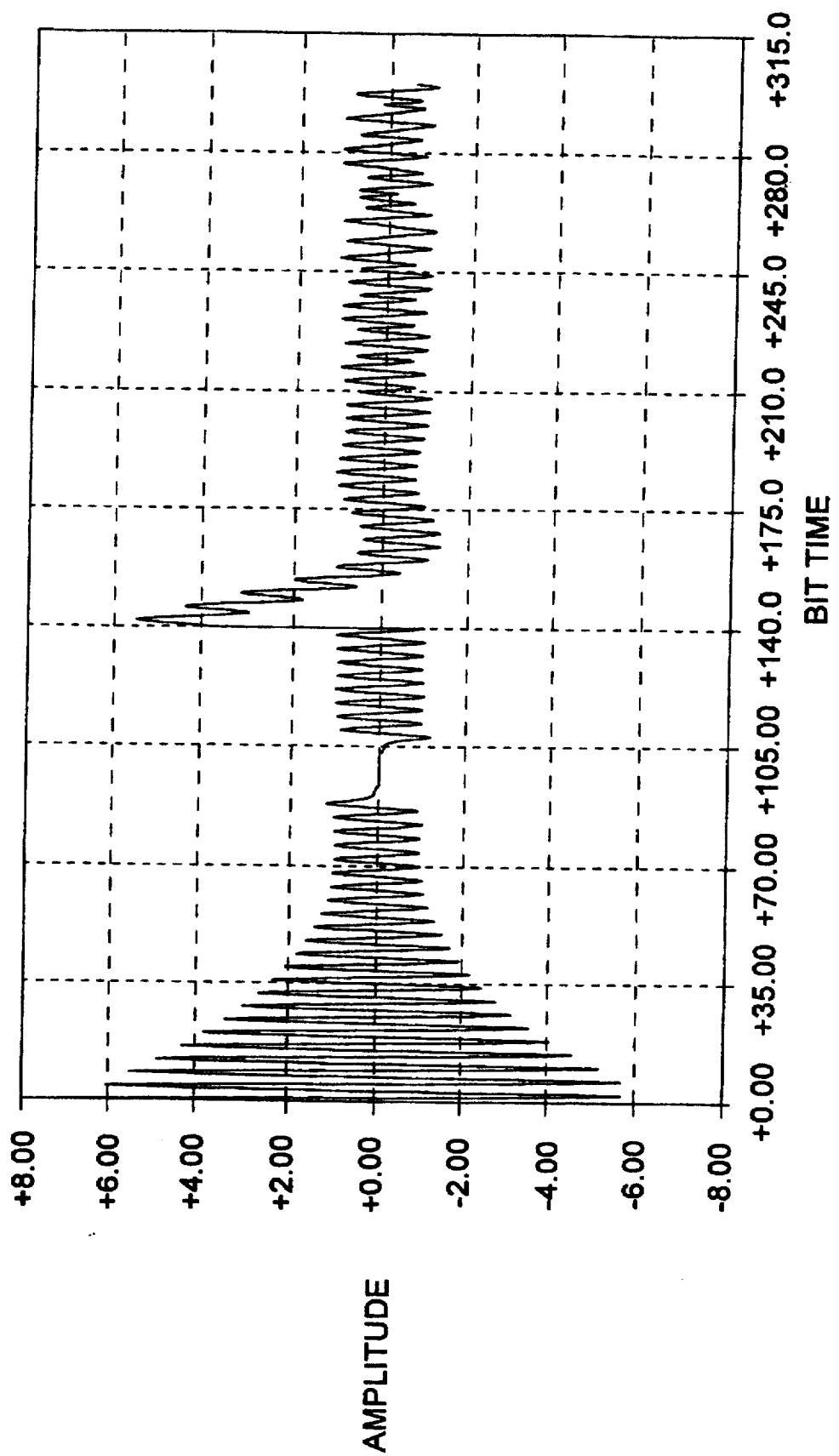
FIG. 8 is an example graph illustrating an amplitude of an output signal with respect to bit time of a variable gain amplifier (VGA) of the control apparatus of FIG. 1.
Figure 9:
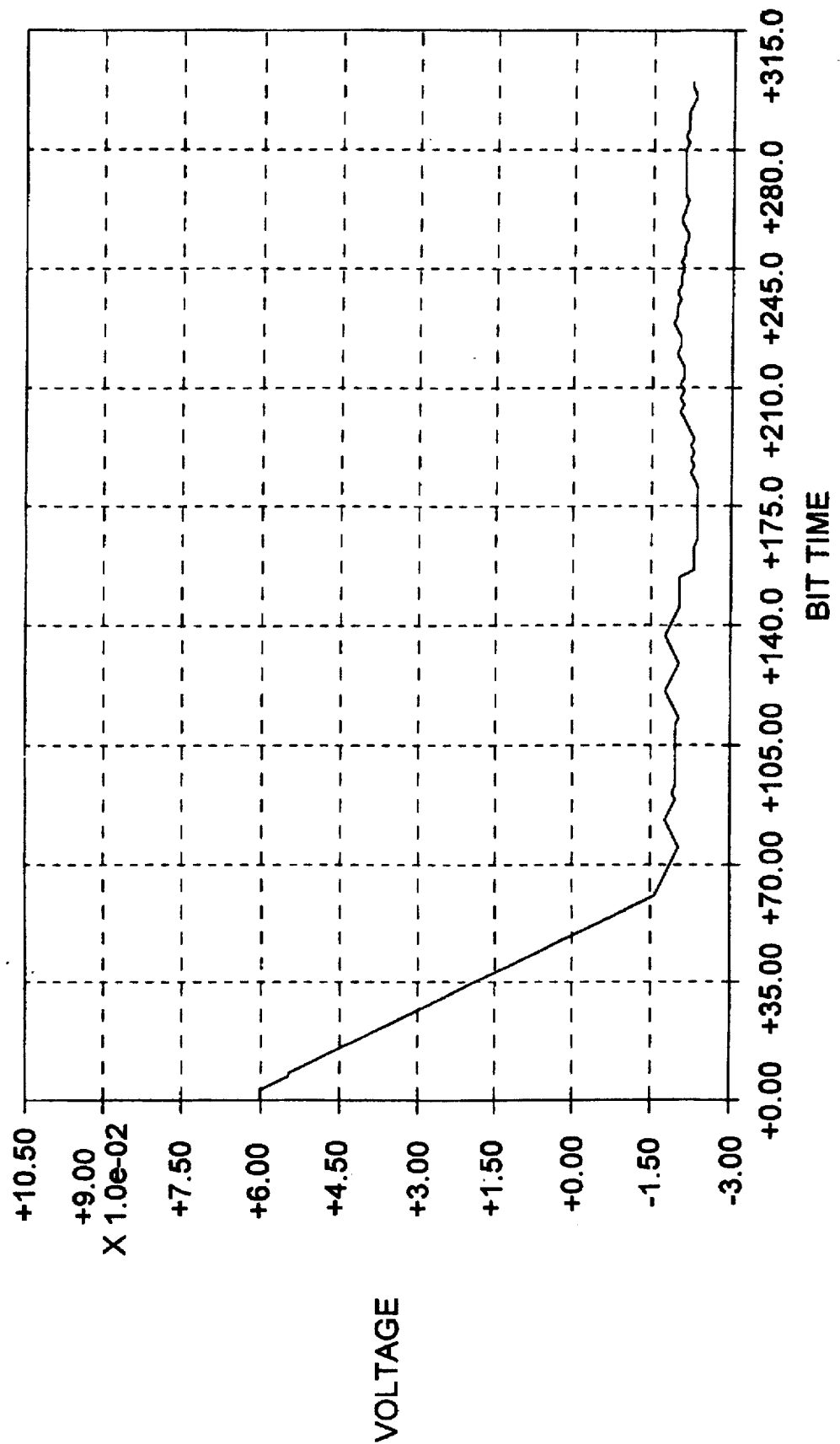
FIG. 9 is a corresponding graph to FIG. 8 illustrating a VGA capacitance voltage of the control apparatus of FIG. 1.

FIGS. 8 and 9 illustrate an example output signal of the VGA 16 and a corresponding capacitor voltage, respectively. As shown in FIG. 8, the input signal to the comparators 22 initially is much too large, contains both a short null signal gap from about bit time 85 to 105 and a thermal asperity from about bit time 140 to 160. As shown in FIG. 9, the capacitance voltage initially corresponds to a LARGE DOWN control output of the envelope detector 24. Then a shift in slope occurs at about bit time 60 corresponds to a LITTLE DOWN control output of the envelope detector 24. No gain correction is provided over the null signal gap and during the thermal asperity.

In brief summary, the present invention provides a powerful, yet efficient, envelope detector 24 that avoids the drawbacks of the prior art solutions. Envelope detector 24 locks to the correct peak-to-peak amplitude independent of pattern with the peak capture function provided by the set reset capture blocks 40, 42, 62, 64, pulse extends 66 and 68 and multiplexer decode 74. The polarity memory 60 provides an intelligent hold over thermal asperities, avoiding erroneous corrections. The use of four comparators 22 as compared to a conventional digital solution with a 6-bit high speed ADC, requires low power and the envelope detector 24 uses no power when held. Envelope detector 24 provides a single solution for both data and servo, saving valuable chip area. Envelope detector 24 provides dual correction levels for quick convergence. Envelope detector 24 provides programmable null signal detection avoiding erroneous corrections over null signal periods, while providing fast recovery to the correction when the gain is truly low. Envelope detector 24 provides a 100% correction rate over sync field and in low gain situations for fast gain convergence. Envelope detector 24 provides effective gain control for use with PRML or other advanced detection techniques.

While the present invention has been described with reference to the details of the embodiments of the invention shown in the drawings, these details are not intended to limit the scope of the invention as claimed in the appended claims.

What is claimed is:

1. Apparatus for gain adjustment of a signal comprising:
   comparator means for comparing the signal with a plurality of threshold values and providing a compared signal;
   capture means coupled to said comparator means for detecting amplitude of the compared signal;
   polarity memory means coupled to said comparator means for detecting polarity of the compared signal;
   gain control means for setting a gain correction value responsive to said capture means and said polarity memory means; and
   timer means coupled to said comparator means for identifying a selected time period for the signal being below a predetermined threshold value and holding the set gain correction value having said identified selected time period.

2. Apparatus for gain adjustment of a signal as recited in claim 1 wherein said gain control means sets a predetermined gain correction value responsive to said timer means.

3. Apparatus for gain adjustment of a signal as recited in claim 1 wherein said timer means is a programmable timer.

4. Apparatus for gain adjustment of a signal as recited in claim 3 further includes multiplexer means coupled to said timer means for selecting a servo timer value or a data timer value.

5. Apparatus for gain adjustment of a signal as recited in claim 1 wherein said gain control means for setting a gain correction value is held for the signal being a single polarity.

6. Apparatus for gain adjustment of a signal as recited in claim 1 wherein said comparator means include means for receiving the analog input signal and for generating a plurality of digital output signals responsive to comparing the signal with said plurality of threshold values.

7. Apparatus for gain adjustment of a signal as recited in claim 1 wherein the signal is a readback signal in a direct access storage device and wherein said gain control means for setting said gain correction value responsive to said capture means and said polarity memory means is used for both data and servo signals.

8. Apparatus for gain adjustment of a signal as recited in claim 7 wherein said gain control means is held for a thermal asperity in the signal.

9. Apparatus for gain adjustment of a signal as recited in claim 1 wherein the signal is a readback signal in a direct access storage device and wherein timer means includes said predetermined time interval being selectively provided for a data signal and a servo signal.

10. A method for gain adjustment of a signal comprising the steps of:
    comparing the signal with a plurality of threshold values and providing a compared signal;
    detecting amplitude of the compared signal;
    detecting polarity of the compared signal;
    setting a gain correction value responsive to the detected amplitude and the detected polarity of the compared signal; and
    identifying a selected time period for the signal being below a predetermined threshold value and holding the set gain correction value during said identified selected time period.

11. A method for gain adjustment of a signal as recited in claim 10 wherein the step of comparing the signal with a plurality of threshold values and providing a compared signal includes the step of receiving art analog input signal;
    comparing the analog input signal with said plurality of threshold values and generating a plurality of digital output signals responsive to the compared values.

12. A method for gain adjustment of a signal as recited in claim 10 wherein the step of setting said gain correction value responsive to the detected amplitude and the detected polarity of the signal includes the step of holding a gain correction value responsive to no change in the detected polarity.

13. A method for gain adjustment of a readback signal for partial-response maximum-likelihood (PRML) and servo channels in a direct access storage device (DASD) comprising the steps of:
    comparing the readback signal with a plurality of threshold values and providing a compared signal;
    detecting amplitude of the compared signal;
    detecting polarity of the compared signal;
    setting a gain correction value responsive to the detected compared signal amplitude and a detected change in polarity of the compared signal; and
    identifying a selected time period for the readback signal being below a predetermined threshold value and holding the set gain correction value during said identified selected time period.

14. A method for gain adjustment of a readback signal for partial-response maximum-likelihood (PRML) and servo channels as recited in claim 13 further includes the steps of identifying a selected time period for the readback signal being below a predetermined threshold value and holding a gain correction value during said identified selected time period and wherein said selected time period includes a first (PRML) data programmable value and a second servo programmable value.

* * * * *

UNITED STATES PATENT AND TRADEMARK OFFICE
CERTIFICATE OF CORRECTION

PATENT NO. : 5,708,537

DATED : January 13, 1998

INVENTOR(S) : Richard Leo Galbraith et al

It is certified that error appears in the above-identified patent and that said Letters Patent is hereby corrected as shown below:

Claim 1, Column 5, Line 40: "having" should be --during--.

Claim 11, Column 6, Line 27: "art" should be --an--.

Signed and Sealed this

Thirtieth Day of June, 1998

Attest:

BRUCE LEHMAN

Attesting Officer

Commissioner of Patents and Trademarks